Aug. 12, 1969   H. J. CARNEY   3,460,528
APPARATUS FOR LOCATING AND REMOVING FOREIGN
MATTER FROM ANIMAL TISSUE
Filed April 20, 1965   5 Sheets-Sheet 1

Henry J. Carney
INVENTOR.

BY
Attorneys

Henry J. Carney
INVENTOR.

Aug. 12, 1969
H. J. CARNEY
3,460,528
APPARATUS FOR LOCATING AND REMOVING FOREIGN MATTER FROM ANIMAL TISSUE
Filed April 20, 1965
5 Sheets-Sheet 3
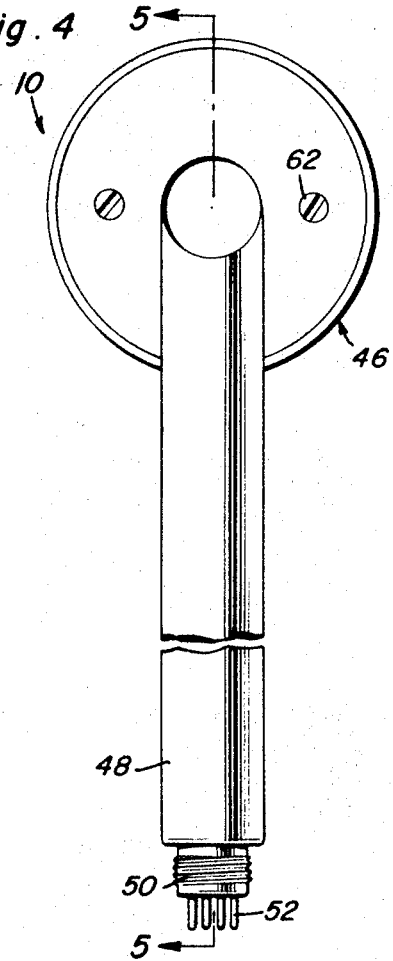
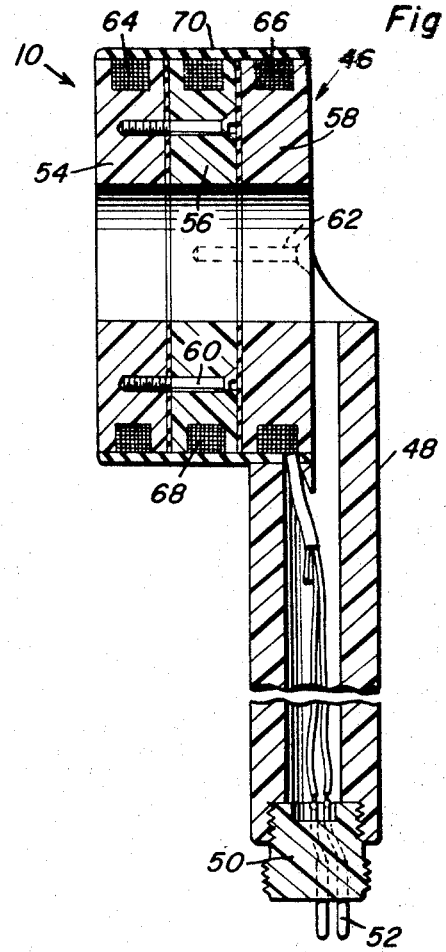
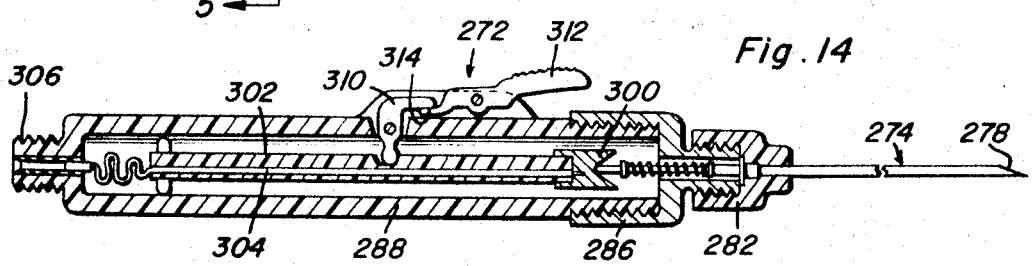
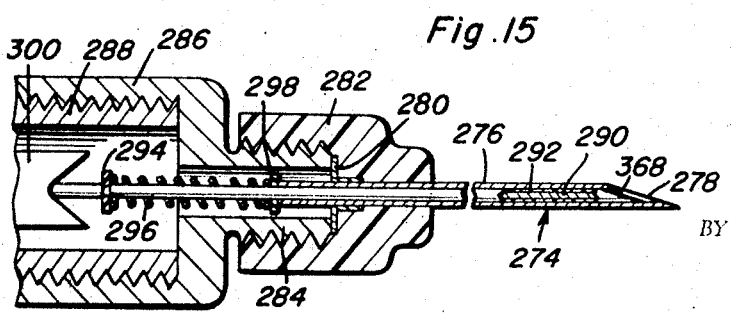
Henry J. Carney
INVENTOR.

Aug. 12, 1969   H. J. CARNEY   3,460,528
APPARATUS FOR LOCATING AND REMOVING FOREIGN
MATTER FROM ANIMAL TISSUE
Filed April 20, 1965   5 Sheets-Sheet 4

Henry J. Carney
INVENTOR.

BY
Attorneys

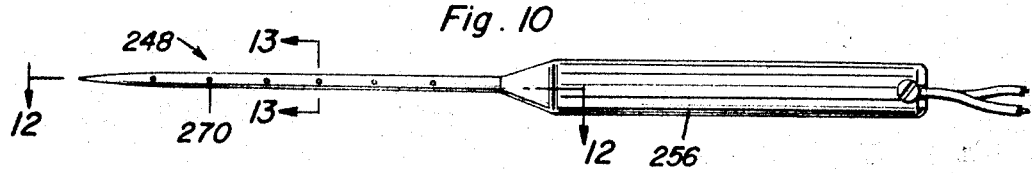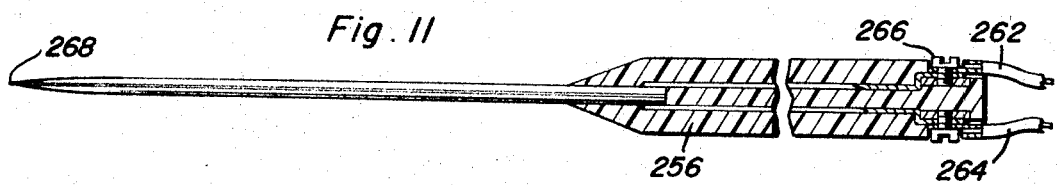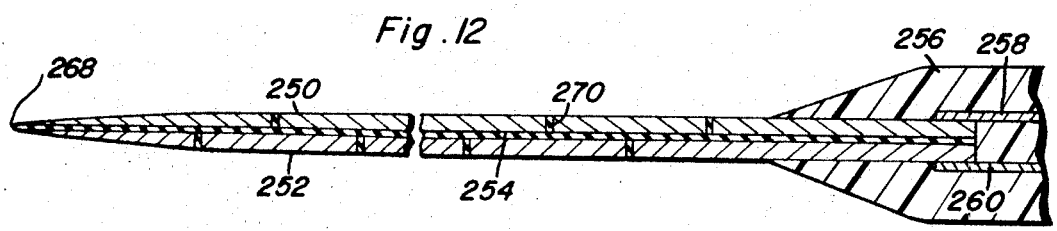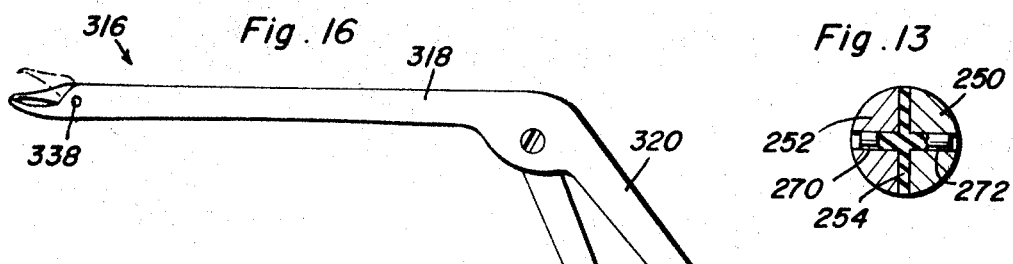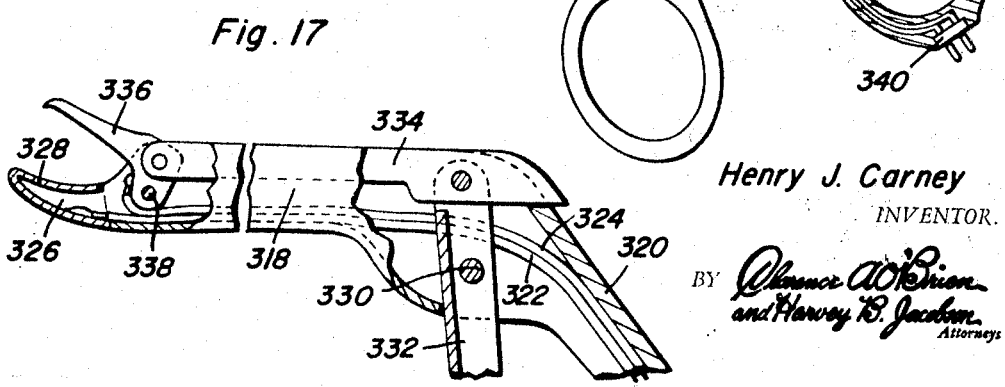

United States Patent Office 3,460,528
Patented Aug. 12, 1969

3,460,528
APPARATUS FOR LOCATING AND REMOVING FOREIGN MATTER FROM ANIMAL TISSUE
Henry J. Carney, Wellesley Hills, Mass.
(Box 294, West Harwich, Mass. 02671)
Filed Apr. 20, 1965, Ser. No. 449,558
Int. Cl. A61b 5/04, 6/02; G01v 33/12
U.S. Cl. 128—2.1                                  10 Claims

ABSTRACT OF THE DISCLOSURE

Electromagnetic search coils in a detector are balanced to establish a neutralized magnetic zone disturbed by the presence of foreign matter embedded in animal body tissue. The disturbance is monitored through a pick-up coil in the detector in order to approximately locate the foreign matter within the body tissue. The foreign matter may then be precisely located or removed by tissue penetrating instruments when registering location of the foreign matter.

---

This invention relates to the detection and location of foreign metallic and/or magnetic particles, fragments, etc. in a medium capable of being readily penetrated in a physical sense and having moderate to high electrical resistivity and low magnetic permeability properties. More particularly the present invention relates to electronic facilities for expediting the location of foreign particles in animal body tissue as well as to aid in the removal thereof.

It is therefore a primary object of the present invention to provide apparatus through which the approximate location of a foreign particle is obtained without penetration of the body tissue, followed by the exact location of the foreign particle in its embedded site with a minimum amount of probing.

An additional object of the present invention in accordance with the foregoing object, is to provide a detector device through which a foreign particle such as metallic or magnetic fragments may be approximately located within body tissue. The detector device employs axially spaced search drive coils constituting part of a primary winding circuit which are air coupled with a secondary pickup coil forming part of a secondary winding circuit, the pickup coil being located in a neutralized magnetic zone between the search drive coils so that when the search coils are brought into proximity of the foreign particle, it will produce unbalance of the primary and secondary winding circuits detected by the pickup coil in the otherwise neutralized magnetic zone. The amplitude of the signal so produced in the pickup coil, will give rise to a proximity indication while the geometry of the detector coils and the axial spacing therebetween will determine the depth range of the detector. One or more detectors may thereby be tailored to the requirements peculiar to the location of foreign particles that have become embedded within body tissue as a result of industrial and other accidents or wounds received in combat.

An additional object of the present invention is to provide apparatus and probe instruments through which the exact location of foreign particles may be obtained with a minimum amount of probing, the probe instruments being effective to establish a signal when contact is made with the foreign particle.

A still further object of the present invention is to provide a control unit through which the aforementioned detection and probing operations may be regulated and monitored in order to aid in the removal of foreign particles from body tissue or flesh whether it be of humans or animals in general.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a front elevational view of one of the detector units to be utilized in the detection operation aforementioned;

FIGURE 5 is a longitudinal sectional view through the detector unit taken substantially through a plane indicated by section line 5—5 in FIGURE 4;

FIGURE 10 is a side elevational view of one type of probe instrument utilized with the apparatus of the present invention;

FIGURE 11 is an enlarged longitudinal sectional view taken through the instrument shown in FIGURE 10;

FIGURE 12 is an enlarged partial sectional view taken substantially through a plane indicated by section line 12—12 in FIGURE 10;

FIGURE 13 is a transverse sectional view taken substantially through a plane indicated by section line 13—13 in FIGURE 10;

FIGURE 14 is a longitudinal sectional view through another type of probe instrument utilized with the equipment of the present invention;

FIGURE 15 is an enlarged sectional view of a portion of the instrument shown in FIGURE 14;

FIGURE 16 is a side elevational view of parts broken away and shown in section of a third type of probe instrument;

FIGURE 17 is an enlarged partial side elevational view of a portion of the instrument shown in FIGURE 16, with parts broken away and shown in section.

For purposes of understanding the terms used hereinafter, "metallic" refers to particles which are fusible, opaque and at least moderately good conductors of electricity including the chemically classified metals, alloys and metal compounds. The term "magnetic" refers to particles or materials which exhibit magnetic properties as understood by persons skilled in the art, having relatively high energy absorption or hysteresis during magnetic induction with a low induction force or low Q when driven by audio frequency energy.

Figure 1:
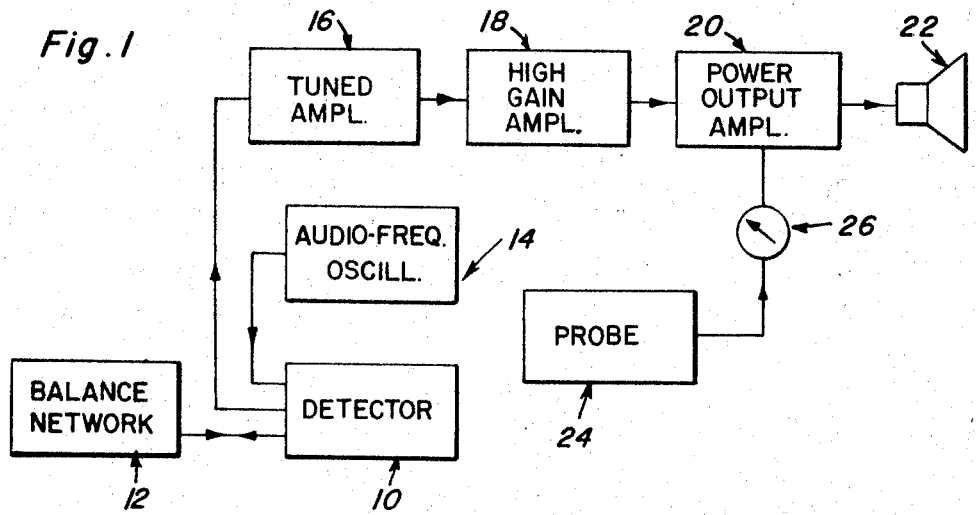
FIGURE 1 is a block diagram illustrating the basic relationships between the various components of the present invention.

The apparatus of the present invention is based upon the location of foreign particles that are metallic or have magnetic properties if embedded within material capable of being readily penetrated and having relatively high electrical resistivity and low magnetic permeability properties. A metallic particle when situated in such an environment, is adapted to be approximately located by means of a detector unit generally referred to by reference numeral 10 as symbolically shown in FIGURE 1 when associated with a balance network denoted by reference numeral 12 and supplied with audio frequency energy from the oscillator 14. The output of the detector is adapted to provide an indication of the proximity of the foreign particle and toward this end, the output signal from the detector is fed to a tuned amplifier component 16 adapted to restrict amplification of the input signal to the audio frequency range of operation of the oscillator 14. The amplified signal is then fed to a high gain amplifier 18 so that a suitably amplified output therefrom may be fed to the power output amplifier 20 in order to produce an audible signal from the speaker 22 and a visible indication on the meter 26. The output of the detector 10 may thereby be monitored in order to approximately locate the foreign particle without penetration of the tissue within which it is embedded. After the foreign particle is so located, an exact location thereof may be obtained by contact with a probe instrument generally referred to by reference numeral 24 arranged to establish a signal indicated by the meter 26 when contact is made with the foreign particle.

Figure 2:
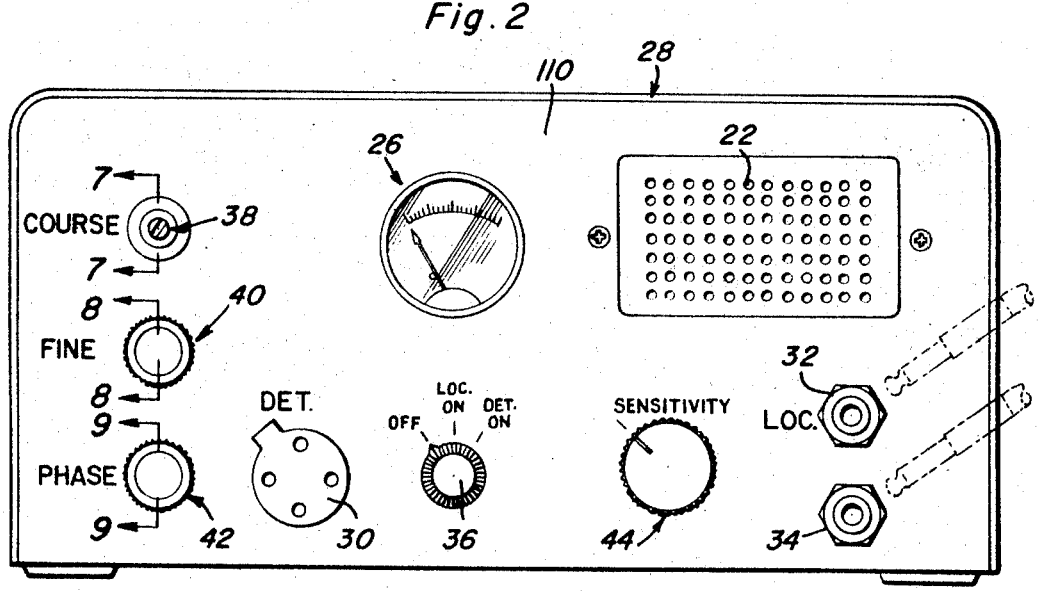
FIGURE 2 is a front elevational view of the control unit through which the detection and probing operations are regulated and monitored.

Referring now to FIGURE 2, a control unit generally referred to by reference numeral 28, is shown within which various components of the apparatus are mounted including the monitoring facilities consisting of the aforementioned speaker 22 and the meter 26. It will, of course, be appreciated, that other monitoring facilities could be utilized including for example an oscilloscope device whereby the signals being monitored may be more precisely analyzed. The input signals monitored through the control unit are derived through the detector unit 10 and the probe instrument 24 as aforementioned. Accordingly, the control unit is provided with a four prong receptacle for the detector unit and a plug in receptacle 32 for the probe instrument. Another plug in receptacle 34 may be provided so as to monitor the input signals through other equipment such as an earphone device. A function selector switch 36 is also mounted by the control unit so as to condition it for the detection operation or the probe operation, as will be hereafter explained. In connection with the detection operation, the detector unit is balanced through the aforementioned balance network by means of a course adjustment control 38, a fine adjustment control 40 and a phase adjustment control 42. Sensitivity of the detector unit may also be regulated through the sensitivity control 44 as well be hereafter explained.

Referring now to FIGURES 4 and 5, it will be observed that the detector unit 10 includes an annular coil supporting assembly 46 to which an elongated tubular handle member 48 is secured extending radially from the coil supporting assembly on one axial side thereof. The end of the tubular handle member 48 remote from the coil supporting assembly, is provided with a threaded connector 50 embedding four connector prongs 52 to which four conductors are connected, said conductors being housed within the tubular handle member 48 and extending to the coils mounted by the coil supporting assembly. The coil supporting assembly includes three separate annular coil form members 54, 56 and 58 made of a material having a relatively low dielectric coefficient, a low magnetic permeability and a relatively high degree of physical strength against deformation. The annular coil form members 54 and 56 are adapted to be held in axially assembled relation to each other by the fastener elements 60 while the fastener elements 62 hold the members 56 and 58 assembled with each other. The axially outer coil form members 54 and 58 respectively mount search coils 64 and 66 which are connected to each other in series and form part of a primary winding circuit. The search coils are mutually air coupled with each other and the center pick up coil 68 mounted by the coil form member 56 within a zone adapted to be magnetically neutralized by the balance network so that when the detector unit is brought into proximity of the foreign particle to be located, the unbalance so produced will induce a signal in the pick up coil 68. The sensitivity of the detector unit will depend upon the coil geometry and in particular the diameter of the coils while the axial spacing between the coils will determine the depth range for which the detector unit is effective. The detector unit is therefore adapted to be moved over the surface of the body or material within which the foreign particle is embedded so as to bring the search coil 64 into the signal producing range of the foreign particle. Also, the coil assembly may be protectively enclosed by a layer of relatively high resilient material 70 so as permit the instrument to be safely sterilized for surgical purposes. It will also become apparent that dimensionally different detector units may be available for use with the apparatus of the present invention in order to meet different requirements.

Figure 6:
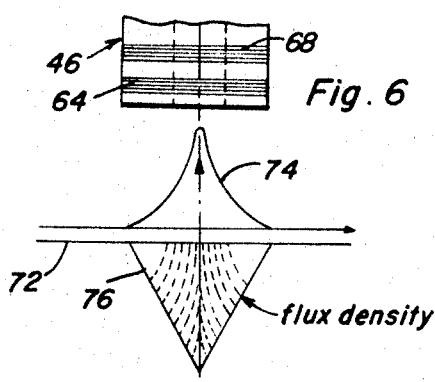
FIGURE 6 is a graphical illustration associated with the operational principles of the detection process.

Referring now to FIGURE 6, it will be observed that when the axis of the coil assembly 46 is aligned with the foreign particle to be located below the surface 72 of the material within which it is embedded, the signal induced within the pick up coil 68 will vary in intensity as depicted by the curve 74. Accordingly, when the audio signal monitored through the speaker 22 is of maximum volume, it will indicate that the axis of the coil assembly is aligned with the foreign particle located within the embedding material as diagrammed in FIGURE 6. The signal so produced in the pick up coil 68, arises because of the location of the foreign particle within the magnetic field emanating from the axial end of the air core associated with the detector unit as characterized by the flux density curve 76 in FIGURE 6. As hereinbefore indicated, the effective depth of the magnetic field will depend upon the axial spacing of the coils so that the foreign particle when disposed within the magnetic field will produce a measurable change in the mutual inductance of the coils in order to unbalance the neutralized magnetic zone within which the pick up coil 68 is located.

Figure 3:
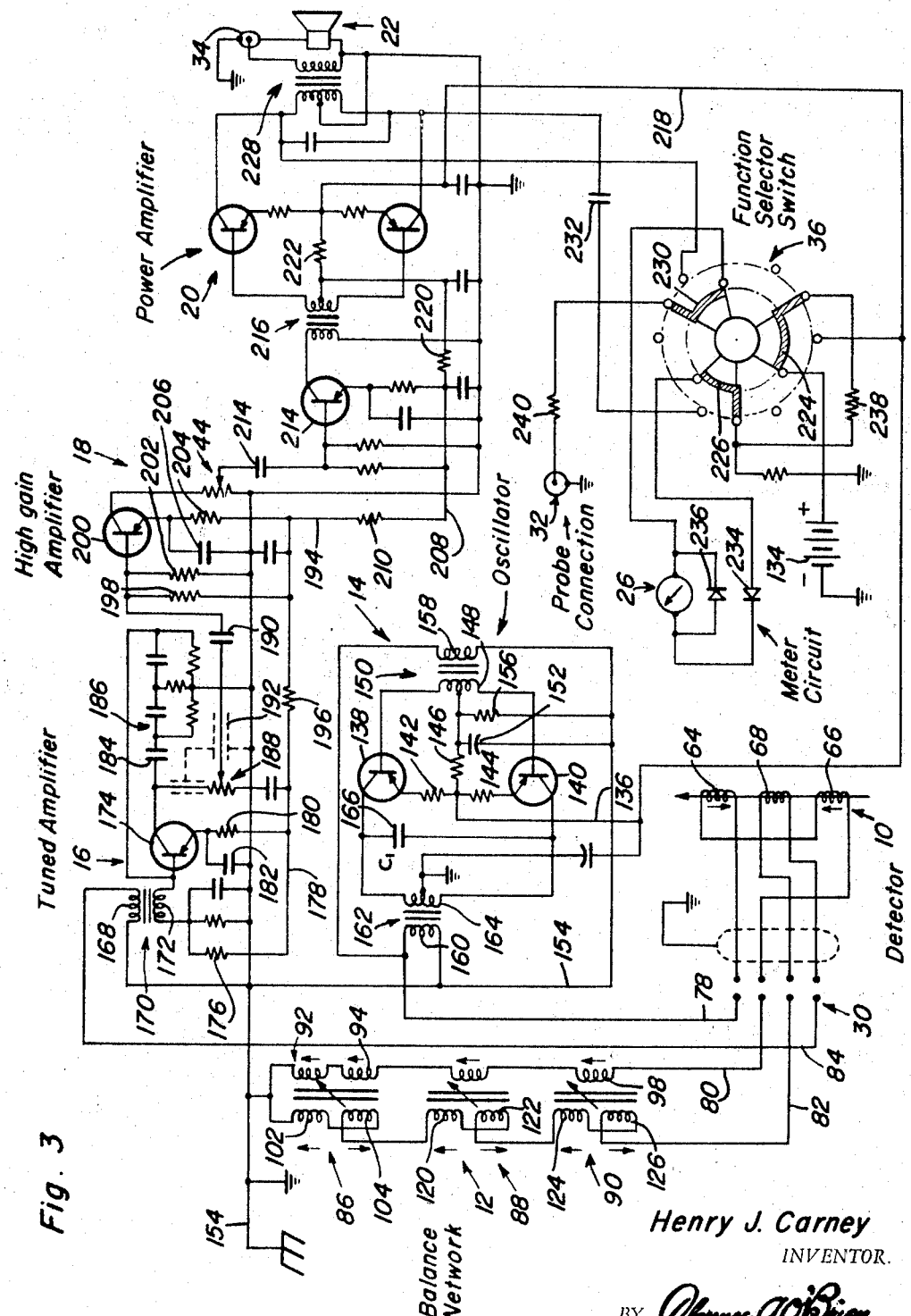
FIGURE 3 is an electrical circuit diagram corresponding to the control circuitry associated with the control unit shown in FIGURE 2.

Referring now to FIGURE 3, it will be observed that the search coils 64 and 66 are electrically connected in series with each other but are wound so as to inductively oppose each other in order to produce the neutralized magnetic zone therebetween when balance is achieved through the primary and secondary winding circuits. One terminal of the search coil 64 is therefore adapted to be electrically connected through the conductor 78 to the oscillator component 14 from which audio frequency energy is supplied to the detector unit. Accordingly, electrical energy is supplied to the search coils connected in series with each other and with the primary winding circuit associated with the balance network 12 through the conductor 80. The conductor 82 connects the secondary winding circuit of the balance network to the pick up coil 68 which in turn is connected by the conductor 84 to the tuned amplifier 16. Accordingly, the signal induced in the pick up coil 68 when the detector unit is brought into the operative range of the foreign particle to be located, will be fed to the amplifier components for monitoring. The coils in the detector unit are accordingly connected to the oscillator 14, the tuned amplifier 16 and the balance network 12 when plugged into the receptacle 30.

The balance network includes three transformer sections 86, 88 and 90. The primary winding of the transformer section 86 includes a pair of coils 92 and 94 which are mutually opposed to each other inductively and electrically connected in series with each other and with the primary coils 96 and 98 in the transformer sections 88 and 90. Each of the transformer sections also includes a pair of secondary coils all of which are electrically connected in series. The adjustment controls 38, 40 and 42 aforementioned, are therefore operative in the respective transformer sections to regulate the mutual inductance of the primary and secondary winding circuits.

Figure 7:
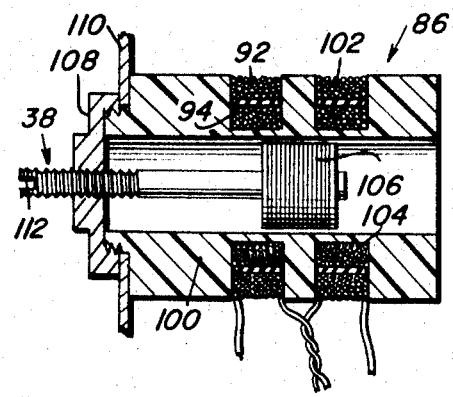
FIGURE 7 is an enlarged partial sectional view taken substantially through a plane indicated by section line 7—7 in FIGURE 2 showing the course inductive adjustment device for the balancing network associated with the present invention.

Referring now to FIGURE 7, it will be observed that the primary coils 92 and 94 are mounted by the coil form member 100 and are mutually opposed while the secondary coils 102 and 104 are mounted in axially spaced relation to the primary coils and are mutually additive. Depending upon the axial position of the iron ferrite slug 106 within the air core for the coils in the transformer section 86, the net mutual inductance between the primary and secondary winding circuits will be either additive, neutral or subtractive with respect to and dependent upon the inductive balance condition of the rest of the winding coils. The effect of adjustment by the control 38 on the balance condition is relatively large so that manipulation of the control 38 is made accessible only with the aid of a screw driver in order to obtain a general balance condition with respect to inductive balance. The control 38 therefore axially projects from the assembly nut 108 by means of which the coil form 100 is clamped to the front panel 110 of the control unit presenting only a screw driver slot 112.

Figure 8:
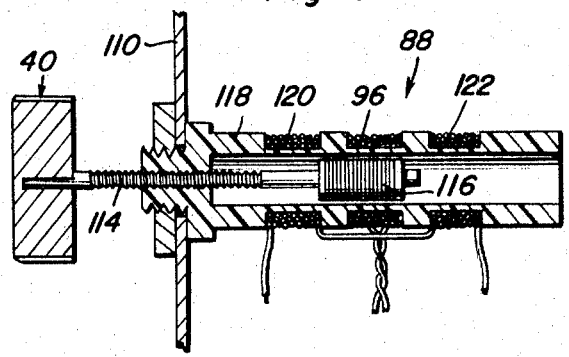
FIGURE 8 is an enlarged partial sectional view taken substantially through a plane indicated by section line 8—8 in FIGURE 2 illustrating the fine inductive adjustment device.

Fine inductive balance is achieved by the fine adjustment control 40 as shown in FIGURE 8. The control 40 is connected to the threaded element 114 to which the tuning slug 116 is connected so as to axially position the tuning slug within the air core formed by the coil form member 118 on which the primary coil 96 is mounted in axially spaced relation between the secondary coils 120 and 122. The secondary coils inductively oppose each other so as to place the center primary coil in a neutral plane of the electromagnetic fields created by the secondary coils when the iron ferrite tuning slug 116 is centered. Thus, the mutual coupling between the primary and secondary coils in the transformer section 88 may be additive or subtractive depending upon the axial position of the tuning slug in order to achieve a fine inductive balance for the detector unit, the coils of which are in the primary and secondary winding circuits of the balance network.

Figure 9:
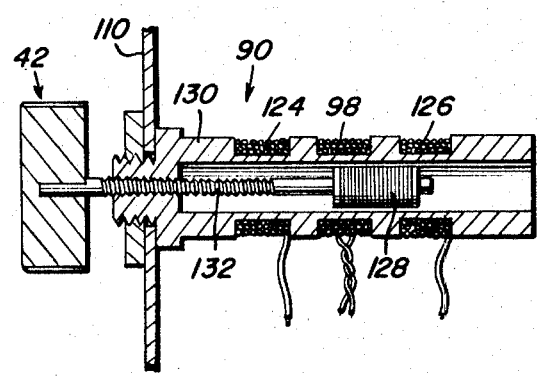
FIGURE 9 is an enlarged partial sectional view taken substantially through a plane indicated by section line 9—9 in FIGURE 2 illustrating the phase adjustment device.

Phase control for the primary and secondary winding circuits is achieved by the transformer section 90 as shown in FIGURE 9, which is similar in construction and arrangement to the transformer section 88 as shown in FIGURE 8. However, the primary coil 98 is mutually coupled to each of the secondary coils 124 and 126 in phase as well as amplitude relationship because of the use of a non-magnetic core material for the tuning slug 128. Accordingly, the tuning slug 128 may be made of brass or copper and is adapted to be axially positioned within the coil form member 130 by rotation of the phase control knob 42 connected to the slug by means of the threaded member 132.

Electrical energy at the proper potential and phase is supplied by conductor 78 to the detector unit by the oscillator component 14, the tuning of which is automatically varied by the load imposed thereon in order to establish a proper impedance match so that different detector units may be utilized without adversely affecting the crucial characteristics of the balance network. Positive potential is supplied to the oscillator component from the battery source of energy 134 adapted to be connected to the positive voltage line 136 through the function selector switch 36 as will hereafter be explained. Thus, a positive bias voltage is applied to the emitters of the PNP transistors 138 and 140 through bias resistors 142 and 144 of a voltage dividing network also including the charging resistor 146. The capacitor 152 is connected between the charging resistor 146 and the ground line 154 and is shunted by the discharge resistor 156 so that an AC voltage will be applied to the center tap of the secondary winding 148 in the load coupling transformer 150, the terminals of which are connected to the bases in the transistors 138 and 140. Accordingly, the transistors will be alternatively biased to a conductive state under control of the AC voltage supplied to the winding 148 which is inductively coupled to the output line 78 of the oscillator through the primary winding 158 in order to vary the oscillating frequency in accordance with the output loading. The oscillating output in the output line 78 is induced within the secondary winding 160 of the output transformer 162 to which the output line is connected. The opposite terminals of the primary winding 164 on the other hand, are connected to the output collectors of the transistors and are provided with a grounded center tap in order to establish a conductive path from the output collectors of the transistors rendered alternatively conductive as aforementioned. Tuning of the oscillator may also be regulated by a tuning capacitor 166 connected across the output collectors of the transistors in order to set the predetermined audio frequency operating range for the oscillator.

With continued reference to FIGURE 3, it will be observed that the output from the pick up coil 68 in the detector is fed through the conductor 84 to the primary winding 168 in the signal transformer 170 associated with the tuned amplifier 16. An AC signal voltage is thereby induced in the secondary winding 172 connected to the base of the PNP transistor 174 of the initial amplifying stage. A bias voltage is supplied to the base through the secondary winding 172 from the voltage reducing resistor 176 connected to the positive voltage line 178. A positive bias voltage is also applied through the bias resistor 180 to the emitter of the transistor 174 shunted by the filter capacitor 182. Accordingly, the AC signal voltage component applied to the base of the transistor 174 will appear as an amplified output at the collector coupled by capacitor 184 to a band pass filter network 186 establishing a feedback path between the collector and the base in order to restrict amplification through the transistor to the operating frequency range of the oscillator 14. The amplified output of the initial stage of the amplifier is supplied through the potentiometer 188 and the coupling capacitor 190 to the initial stage of the high gain amplifier 18. The output from the tuned amplifier is shielded from the feedback path through the shielding 192 in order to preserve the frequency selective feature of the amplifier.

Operating voltage is supplied to the initial stage of the high gain amplifier from the positive voltage line 194 separated by voltage reducing resistor 196 from the voltage line 178 aforementioned. Accordingly, the positive voltage line 194 is connected by the bias resistor 198 to the base of the PNP transistor 200 for maintaining a bias voltage thereon at a predetermined level above the ground line 154 as regulated by the resistor 202. The positive voltage line also supplies through resistor 204, a positive bias on the emitter of the transistor 200 and is shunted by the capacitor 206 in order to prevent loss of gain at the lower operating frequencies. The output of the first amplifier stage is fed through the sensitivity control potentiometer 44 to the second stage which is supplied with a higher operating voltage from the positive voltage line 208 separated from the voltage line 194 by the voltage reducing resistor 210. Accordingly, the second amplifier stage includes the transistor 212 the base of which is connected to the sensitivity potentiometer 44 through the coupling capacitor 214. Bias voltage is maintained on the base and emitter of the transistor 212 by an arrangement similar to that described with respect to transistor 200 in the first amplifier stage. Accordingly, a relatively high gain output is obtained from the collector of transistor 212 and is fed to the power amplifier 20 through the coupling transformer 216. The power amplifier operates in a well known fashion to drive the speaker 22, both the power amplifier 20 and the speaker 22 being rendered operative when directly connected to the positive terminal of the battery 134 by the conductor 218. Operating voltage for the other amplifier stages will then also be supplied through the voltage reducing resistors 220 and 222.

When the function selector switch assembly 36 is displaced to its clockwise position, the positive terminal of the battery 134 is connected by the conductive strip 224 to the positive voltage line 218 through which operating voltage is supplied to the amplifier stages as aforementioned. The positive voltage line 218 is also connected to the conductor 136 through which operating voltage is supplied to the oscillator 14 as aforementioned. In the same detector operating position of the function switch, the conductive strips 226 and 230 will connect the primary of the output transformer 228 to the meter 26. Accordingly, one terminal of the transformer primary will be connected through the isolation capacitor 232 and the diode 234 to the meter 26 while the other terminal of the primary will be directly connected to the meter which is shunted by the diode 236. Accordingly, unidirectional current is conducted through the meter in order to provide a visual indication of the volume or amplitude of the audio signal which drives the speaker 22. Thus, both visual and audible monitoring of the output signal from the detector unit will be available. Audible monitoring of the output signal may also be accomplished by use of an earphone headset adapted to be plugged into the speaker circuit through the plug in connector receptacle 34.

When the function selector switch is angularly displaced from the off position to the intermediate position shown in FIGURE 3, the battery source 134 is disconnected from the voltage line 218 and is then connected through conductive strip 224, resistor 238, conductive strip 226 and diode 234 to one terminal of the meter 26, the other terminal of the meter being connected by conductive strip 230 and resistor 240 to the probe connection receptacle 32. Accordingly, a probe instrument 24 may be plugged into the receptacle 32 so as to complete a circuit through the meter 26 when the probe instrument makes contact with the foreign particle. The circuit so established will be operative to provide a calibrated reading on the meter 26 indicating that the foreign particle has been located by the probe instrument.

Figure 18:
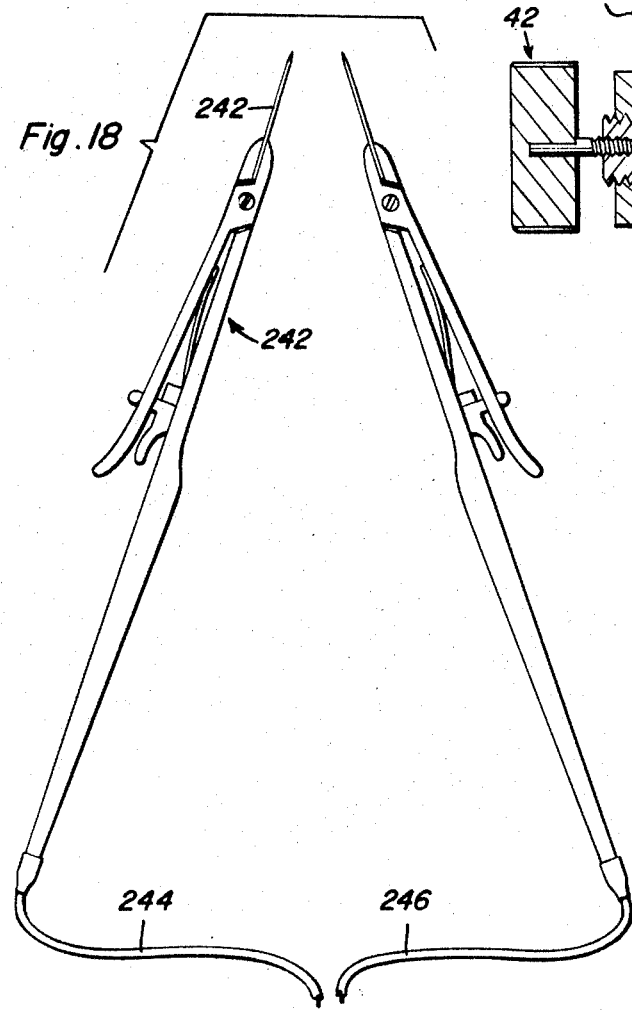
FIGURE 18 is a side elevational view of a set of probe instruments constituting a fourth type of probe locating facility.

Referring now to FIGURE 18, it will be observed that one type of probing may be accomplished by means of a pair of conductive needles 242 respectively held by releasable clamp holders 243 from which electrical conductors 244 and 246 extend. The conductors 244 and 246 are adapted to be connected to a plug in connector received within the probe connection receptacle 32 so as to complete the meter circuit when both of the needles 242 to which the conductors are electrically connected, are conductively bridged by the foreign particle being sought. The needle probing instruments will require manipulation by both hands of the surgeon and may be most suitable under certain circumstances.

Referring now to FIGURES 10 through 13, a second form of probing instrument 248 is shown which requires manipulation by one hand only freeing the other hand for other functions. The probing instrument 248 includes a pair of elongated piercing elements 250 and 252 nonconductively spaced throughout by an elongated insulator element 254. The piercing elements are embedded adjacent one end, within a non-conductive handle member 256 within which a pair of conductors 258 and 260 are also embedded in electrical contact with the piercing elements. Insulated conductors 262 and 264 are therefore electrically connected to the conductors embedded within the handle by means of the terminal posts 266 so that when the ends of the conductive piercing elements 250 and 252 at the tip portion 268 are conductively bridged by the foreign particle being sought, the meter circuit will be completed as aforementioned in order to indicate location of the foreign particle. The piercing elements are provided with a plurality of longitudinally spaced apertures 270 receiving projections 272 which extend transversely from opposite sides of the insulator element 254 in order to axially anchor the piercing elements relative to each other. It will therefore be apparent, that the probing instrument 248 will preclude any unintentional contact between the conductive piercing elements as is possible in the case of the probing facilities described with respect to FIGURE 18.

A probing instrument adapted to be manipulated by a single hand, is also illustrated in FIGURES 14 and 15. In this type of instrument generally referred to by reference numeral 272, a replaceable piercing element 274 is utilized including an outer tubular piercing element 276 having a beveled tip portion 278. The tubular piercing element is axially fixed by the bushing flange element 280 within a non-conductive, internally threaded connector member 282. The connector member is therefore adapted to be threaded onto the axially projecting threaded portion 284 of a conductive cap 286 threadedly secured to one axial end of a handle member 288. Slidably mounted within the tubular piercing element is a rod element 290 which is non-conductively spaced from the tubular piercing element by a non-conductive sheathing 292. The rod element 290 projects axially from the tubular element opposite the piercing tip portion 278 thereof and has a thrust washer 294 connected thereto against which one end of a coil spring 296 reacts. The other axial end of the coil spring reacts against a thrust washer 298 secured to the axial end of the tubular piercing element 276 in order to bias the rod element 290 to a retracted position as more clearly shown in FIGURE 15.

When assembled onto the conductive cap 286, electrical contact is established between the tubular piercing element and the conductive cap by means of the flange member 280 while electrical contact is established between the rod element 290 at the projecting end thereof with the conductive engaging member 300. The engaging member 300 is mounted at one end of a non-conductive slide member 302 through which the conductor 304 extends establishing electrical contact between the member 300 and one of the conductors extending from the rear end 304 of the instrument handle member 288. A second conductor extends from the rear end of the instrument handle and is electrically connected to the conductive cap member 286 so that when electrical contact is established between the beveled end 308 of the rod element 290 and the beveled tip end 278 of the tubular piercing element 276, the meter circuit to which the probe instrument 272 is adapted to be connected, will be completed. In view of the retracted position to which the rod element 290 is biased by the spring 296, no electrical contact is established at the tip end until the tubular element is axially displaced against the bias of the spring 296 by the foreign particle engaged therewith whereupon the foreign particle will electrically bridge the beveled ends of the rod element and the tubular element in order to establish the electrical connection aforementioned. Alternatively, the rod element 290 may be axially displaced against the bias of the spring 296 from its retracted position in order to selectively test whether or not the beveled tip end 278 of the piercing element is in contact with the foreign particle. Accordingly, the non-conductive slide element 302 is provided with a notch intermediate the opposite ends thereof receiving the engaging end of a lever element 310 pivotally mounted by the handle member 288. The handle member also pivotally mounts a finger operated trigger element 312 having an engaging end 314 operative to pivotally displace the lever element 310 when the trigger element 312 is depressed against the handle. The slide member 302 will then be operative to displace the engaging member 300 in a right hand direction as viewed in FIGURE 14 for purposes aforementioned. In addition to avoiding undesired contact between the rod element and the tubular piercing element, the probing instrument 272 will also make available a disposable type of piercing needle assembly 274 which is particularly useful where rapid sterilization of the probing instrument is required.

The probing instrument generally referred to by reference numeral 316 as depicted in FIGURES 16 and 17, is particularly useful with the apparatus of the present invention for removal of foreign particles from gelatinous type of tissues or fluent substances where extraction may involve only the grasping of the foreign particle. The instrument 316 is of the forcep type including a stationary non-conductive body member 318 having a handle portion 320 through which a pair of insulated conductors 322 and 324 extend. A fixed jaw 326 is formed at the end of the body member 318 and mounts a gold electrode 328 to which the conductor 322 is electrically connected. The body member 318 is provided with a pivot 330 for pivotally mounting an actuator handle 332 which is pivotally connected to the link element 334 for displacement thereof relative to the body member 318. The link element 334 is therefore pivotally connected to a movable jaw element 336 made of electrically conductive material to which the conductor 324 is electrically connected. The movable jaw element 336 is therefore pivotally mounted by the pivot pin 338 extending through the stationary body member so that upon displacement of the movable handle portion 332 toward the stationary handle portion 320, the movable jaw element 336 will be displaced toward the fixed jaw element 326. It will therefore be apparent, that when a foreign metallic body is grasped between the jaw elements, it will electrically bridge the electrode 328 and the conductive jaw element 336 in order to complete the meter circuit through the conductors 322 and 324 to which the instrument 316 is adapted to be connected. Accordingly, the stationary handle portion 320 of the instrument may be provided with a two prong connector element 340 through which a two wire conductor may connect the instrument to the control unit 28 via the connector receptacle 32 aforementioned.

From the foregoing description, the construction, operation and utility of the apparatus associated with the present invention will be apparent. To use the apparatus, the detector device 10 is plugged into the control unit through the receptacle 30 and the function selector switch 36 rotated to its detection operating position. Assuming that the balance network 12 has been adjusted for general balance, the adjustment control knobs 40 and 42 are then manipulated until no output indication is received through the audio speaker or transducer 22 and no visual indication is obtained on the meter 26. Under these conditions, a neutralized magnetic zone will have been established between the search coils 64 and 66 in the detector unit. The detector unit is then reciprocated in one plane over the surface of the material within which some foreign particle is to be located as for example the skin of a patient. When the detector unit is within the operative range of the foreign particle, an output will be produced which may be monitored through the speaker 22, the visual indicator 26 or any other monitoring facilities such as an earphone or an oscilloscope adapted to be connected to the control unit by a plug in jack received within the plug in receptacle 34. In view of the presence of the tuned amplifier 16, any output indication will be restricted to the operating frequency of the electrical energy supplied to the detector by the oscillator 14. Thus, any source of error is eliminated because of stray electromagnetic radiations. Also, by adjustment of the sensitivity control 44, the operator may regulate to some extent, the sensitivity of the detecting device.

While the detector is reciprocated, the axis of its coil assembly 46 is shifted until it is at a location at which maximum volume is obtained from the speaker 22 monitoring the output signal of the detector. A mark may be made on the body at this location in the form of a line drawn parallel to the reciprocatory motion imparted to the detector unit. From the same location so marked, the detector unit is then reciprocated in the same plane but in a direction perpendicular to the previous reciprocatory direction and the coil axis shifted until a maximum output is again obtained from the speaker 22 at a second location. A mark line perpendicular to the previous mark line is then drawn from the second location so that where it intersects the first mark line, the location of the foreign particle relative to one plane surface will have been completed. In a similar fashion intersecting lines may be marked on a plane surface of the body perpendicular to the first plane surface. The foreign particle will then be located internally of the body at the intersection of lines extending perpendicular to said plane surfaces from the intersection of said marked lines.

From the location so marked on the body utilizing the detector unit, penetration may be made utilizing one of the probing instruments hereinbefore described until contact is made with the foreign particle. An indication of such contact with the foreign particle will be established with the visual indicator 26 after the control unit has been conditioned for probing operation by displacement of the function switch 36 to the probe locating position. In connection with the removal of foreign particles from gelatinous substances, such as the eyes, the forcep type of probe instrument 316 may be utilized.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for locating a metallic particle embedded within non-magnetic material comprising a source of electrical energy, monitoring means connected to said source of energy, detector means internally establishing a magnetic field in response to approach thereof to the metallic particle, oscillator means connected to said detector means for supply of energy thereto at an operating frequency varied by the loading of the detector means within a predetermined audio frequency range, an amplifier connected to said detecting means for amplifying a signal produced by variation of said magnetic field within the detector means including means for limiting amplification to said predetermined audio frequency range, means connecting said amplifier to the monitoring means for registering the amplitude of the amplified signal, probe means connected to said monitoring means for indicating contact with said metallic particle, and function selecting means operatively connected to the source of electrical energy for alternatively energizing the oscillator means and the probe means to register detection and location of the metallic particle by the monitoring means.

2. The combination of claim 1 wherein said detecting means comprises a primary winding having a pair of series connected search coils wound in inductively opposing relation to each other, a secondary winding including a pick-up coil, coil supporting means mounting said pick-up coil in axially spaced relation between said pair of search coils for air coupling the primary and secondary windings and a balancing network interconnected between primary and secondary windings for establishing a neutralized magnetic zone axially between the search coils in response to supply of electrical energy to the primary winding from the oscillator means.

3. The combination of claim 2 wherein said balancing network comprises a plurality of transformer sections, each transformer section having a primary coil, a pair of series connected secondary coils wound in inductively opposing relation to each other, and a coil form supporting the primary and secondary coils in axially spaced relation to each other, primary circuit means connecting said primary coils in series with the search coils, secondary circuit means connecting the secondary coils in series with said pick-up coil, tuning core means mounted for axial displacement through the coil forms of at least two of said transformer sections to inductively vary the mutual impedance of the primary and secondary circuit means, one of said tuning corem eans being made of non-magnetic material for also varying the phase relationship of the primary and and secondary circuit means, and output means connecting the secondary circuit means to the amplifier for conducting a signal induced in the pick-up coil within the neutralized magnetic zone.

4. The combination of claim 3 wherein said probe means includes a pair of electrically conductive piercing elements having tips adapted to be bridged by the metallic particle, and means electrically connecting said piercing elements to the source of energy and the monitoring means respectively.

5. The combination of claim 4 wherein said probe means further includes insulator means anchored to the piercing elements longitudinally thereof for closely spacing said elements in non-conductive relation to each other and handle means connected to said elements.

6. The combination of claim 1 wherein said probe means comprises a tubular piercing element, a rod element slidably mounted in non-conductive relation within said tubular element, each of said elements having a tip adapted to contact the metallic body to electrically bridge the elements, a handle mounting the tubular piercing element, spring means engageable with said elements for yieldably holding the tip of the rod element retracted within the tubular piercing element, and means mounted on the handle for selectively displacing the rod element against the bias of said spring means to project the tip of the rod element from the tubular piercing element.

7. The combination of claim 1 wherein said probe means includes a pair of jaws, means respectively connecting said jaws to the source of energy and the monitoring means, and operating means connected to the jaws for displacement thereof toward each other to establish electrical contact therebetween when gripping the metallic particle.

8. The combination of claim 1 wherein said probe means includes a pair of electrically conductive piercing elements having tips adapted to be bridged by the metallic particle, means electrically connecting said piercing elements to the source of energy and the monitoring means respectively, insulator means anchored to the piercing elements longitudinally thereof for closely spacing said elements in con-conductive relation to each other and handle means connected to said elements.

9. A locator probe device adapted to contact a metallic particle comprising a pair of electrically conductive elements having longitudinally spaced apertures therein, an elongated insulator element spacing the conductive elements throughout, a plurality of projections extending transversely from opposite sides of the insulator element into the apertures for axially anchoring the conductive elements relative to the insulator element, and a handle secured to the conductive elements.

10. A locator probe device adapted to contact a metallic particle comprising a tubular element having a sharp piercing tip, a rod slidably mounted in non-conductive relation within said tubular element, a handle mounting the tubular piercing element, spring means for yieldably retracting the rod within the tubular element, and means mounted on the handle for selectively displacing the rod against the bias of said spring means to project and expose the rod from the tip of the tubular element, whereby said rod and tubular element may be electrically bridged by the metallic particle.

References Cited

UNITED STATES PATENTS

| 2,451,596 | 10/1948 | Wheeler | 324—41 X |
| 2,550,688 | 5/1951 | Gossick | 324—41 X |
| 3,020,475 | 2/1962 | Walton | 324—41 |
| 1,831,280 | 11/1931 | Wright et al. | 128—1.4 |
| 2,176,479 | 10/1939 | Willis. | |
| 2,321,355 | 6/1943 | Berman | 128—1.4 |
| 2,321,356 | 6/1943 | Berman | 128—1.4 |
| 2,442,805 | 6/1948 | Gilson | 128—2.1 |
| 2,444,207 | 6/1948 | Smith | 128—2.1 |
| 2,549,567 | 4/1951 | Berman | 128—1.4 X |
| 3,054,026 | 9/1962 | Lovell | 317—123 |
| 2,516,882 | 8/1950 | Kalom | 128—2.1 |

WILLIAM E. KAMM, Primary Examiner

U.S. Cl. X.R.

324—41